Patented July 30, 1940

2,209,357

UNITED STATES PATENT OFFICE 2,209,357

CELLULOSE ESTER COMPOSITIONS

Henry B. Smith, Rochester, N. Y., assignor to Eastman Kodak Company, Rochester, N. Y., a corporation of New Jersey No Drawing. Application June 16, 1939, Serial No. 279,532

7 Claims. (Cl. 106—40)

This invention relates to a composition of a lower fatty acid ester of cellulose at least 8% of which consists of propionyl or butyryl groups and 5–40% of dibutyl sebacate as the plasticizer therefor.

Dibutyl sebacate is compatible only to the extent of about 5% with commercial cellulose acetate which amount is not sufficient to provide any appreciable plasticization. In contrast to its action with cellulose acetate, dibutyl sebacate is compatible in various proportions with propionic or butyric acid esters of cellulose and give compositions of a plastic nature.

An object of my invention is to provide a plasticizer for the propionic or butyric acid esters of cellulose which results in a composition from which sheeting of good flexibility or products having good qualities may be obtained. Another object of my invention is to provide a plasticizer for propionic or butyric acid esters of cellulose which is highly resistant to moisture, thus assuring permanence of the composition under the most widely varying weather conditions. Other objects of my invention will appear herein.

Cellulose acetate has a number of uses, but the plasticizers, which are useful therewith and which resist the effect of moisture, are rather limited. For the making of products, particularly those which are subjected to immersion in water, such as fish baits, protective coverings and the like, a composition, which retains its permanence in contact with water, should be used. I have found that propionic or butyric acid esters of cellulose, containing at least 8% of propionyl or butyryl, which have been plasticized with dibutyl sebacate, retain their plasticity when employed in situations where constant contact with water is the rule. Whereas compositions using plasticizers which have leaching tendencies are used, warping and loss of plasticity occurs, the compositions, in accordance with my invention, retain their original properties over a long period of years without brittleness or warping occurring.

The cellulose esters used in compositions, in accordance with my invention, may be fully esterified or they may be partially hydrolyzed. The fully esterified propionic or butyric acid esters of cellulose may be cellulose acetate propionates or cellulose acetate butyrates prepared in accordance with U. S. Patents Nos. 1,800,860, dated April 14, 1931, and 2,048,685, dated July 28, 1936, of Clarke and Malm; U. S. Patent No. 2,113,301, dated April 5, 1938, of Gardner; U. S. Patent No. 2,135,979, dated November 8, 1938, of Malm; or in accordance with applications Serial Nos. 192,063, filed February 23, 1938, of Blanchard, and 254,492, filed February 3, 1939, of Malm and Kirton. Cellulose tributyrate and cellulose tripropionate may also be used as the cellulose ester, either alone or with a mixed ester, in a composition in accordance with my invention. Instead of a fully esterified ester, a partially hydrolyzed propionic or butyric acid ester of cellulose may be employed, particularly if the amount of hydrolysis has been small. For instance, a cellulose ester, such as described and claimed in Malm Patent No. 2,026,583, dated January 7, 1936, may be employed in my composition. As increase of hydrolysis increases the susceptibility to moisture, it is preferred that the hydrolysis, either of the mixed ester or of the simple propionic or butyric acid ester of cellulose, go no further than three or even two hydroxyls per 24 carbon atoms. If the moisture resistance is not critical, a larger latitude is, of course, permissible. The particular cellulose ester used depends upon the properties desired in the composition and the use to which it is to be put. Also, if the composition is to be used in a situation where it is subjected to the direct effect of moisture or an elevated temperature, a higher proportion of propionyl or butyryl, such as at least 25%, is more desirable.

The dibutyl sebacate effectively plasticizes cellulose esters containing at least 8% of propionyl and butyryl and no more than 3 free hydroxyls per 24 carbon atoms in the cellulose unit when 5–40 parts are present per 100 parts of the cellulose ester. Generally not more than 20 parts of the dibutyl sebacate is sufficient to impart the desired amount of plasticity to the cellulose ester composition in accordance with my invention.

As an example of the use of my invention for the manufacture of sheeting, such as may be employed for photographic film base, a mixture of 100 pounds of substantially fully esterified cellulose acetate propionate, having a propionyl content of approximately 15%, was dissolved with stirring in from 500–600 parts by weight of ethylene chloride. To this solution may be added 20 parts by weight of dibutyl sebacate.

The solution of the cellulose ester and dibutyl sebacate was deposited upon a suitable film-forming surface in a thin layer and, upon evaporation of the solvent therefrom, a sheet was produced having a permanently-brilliant transparency, low inflammability, good toughness and high flexibility. This film had an initial flexibility from 240–720% that of a sheet of the cellulose ester without plasticizer. Not only does the sheet have a high flexibility, but also this flexibility is retained even though the sheet is subjected to a temperature of 65° C. for 170 days and probably considerably longer. An unplasticized film of the same cellulose ester was found to become brittle at the end of 72 days at 65° C. Partially hydrolyzed esters, as designated, give results similar to those given by the fully esterified esters.

Compositions, in accordance with my invention, are also suitable for use in processes wherein the composition is softened by means of heat and then formed into the desired shape, such as in the absence of a volatile solvent. As my compositions retain their plasticization, the resulting products are of good quality, obviously providing stable materials present in the composition. Due to the resistance to moisture of dibutyl sebacate, the product so formed does not deteriorate in use.

I have found that dibutyl sebacate is superior to other plasticizers for propionic and butyric acid esters of cellulose in resistance to boiling water. For instance, cellulose acetate butyrate sheeting, containing 40 parts of dibutyl sebacate and having the following dimensions, 1″ x 4″ x .025″, was subjected to boiling water for one hour without any loss of dibutyl sebacate therefrom. Fifteen other samples of sheeting were also tested using a similar ester and plasticizers known to me to be suitable for propionic and butyric acid esters of cellulose. All but one of these other samples lost plasticizer after being treated with boiling water for one hour. Thus it may be seen that dibutyl sebacate is particularly distinctive and unique in its resistance to adverse conditions of temperature and moisture.

Products prepared from my composition, as pointed out above, may be used in instances where immersion in water is common. For instance, cellulose acetate containing a commonly employed acetate plasticizer in the form of sheeting was immersed in water at 100° F. for two weeks. It was found to lose over 18% in weight showing that the best plasticizers for cellulose acetate are lost upon immersion of the acetate in water. However, when sheeting, consisting of cellulose acetate butyrate, having a butyryl content of more than 8%, and 40% of dibutyl sebacate, was immersed in water at 100° F. for two weeks, the sheet gained approximately one percent in weight. It was found that the cellulose acetate had lost approximately 24% of its plasticizer whereas the loss of plasticizer of the cellulose acetate butyrate sheeting, containing 40% of dibutyl sebacate as the plasticizer, was so small as to be considered substantially within experimental error (about 0.5%). Also, the cellulose acetate butyrate sheeting retained its transparency which was not true of the cellulose acetate sheeting. In every instance where dibutyl sebacate has been tested as a plasticizer for butyric or propionic acid esters of cellulose, whether the propionyl or butyryl content was around 10-15% or around 25-30%, or from 35% up to where the acyl content consists entirely of propionyl or butyryl or in any of the intermediate propionyl or butyryl contents in the entire range from 8% up to full esterification, dibutyl sebacate has been found to have properties which make it particularly useful for this purpose.

In view of the valuable plasticizing effect of dibutyl sebacate, other plasticizers may be mixed therewith in amounts up to 50% without detracting from the composition. For instance, a mixture of equal parts of dibutyl sebacate and triphenyl phosphate has ben employed for plasticizing high propionyl or butyryl cellulose esters, the resulting product having high moisture resistance and good plasticity. By using triphenyl phosphate the resistance to inflammability of the composition is increased. This composition has also been found to be suitable for uses where the product was subjected to the effect of water or moisture, moderately elevated temperatures or weather conditions generally.

I claim:

1. A composition of matter comprising 100 parts of a lower fatty acid ester of cellulose containing at least 8% of propionyl or butyryl groups and not more than 3 free hydroxyls per 24 carbon atoms in the cellulose unit, and 5–40 parts of a plasticizer at least half of which consists of dibutyl sebacate.

2. A composition of matter comprising 100 parts of a butyric acid ester of cellulose containing at least 8% of butyryl and not more than 3 free hydroxyls per 24 carbon atoms in the cellulose unit and 5–40 parts of a plasticizer, at least half of which is dibutyl sabacate.

3. A composition of matter comprising 100 parts of a mixed lower fatty acid ester of cellulose containing not more than 3 free hydroxyls per 24 carbon atoms in the cellulose unit, fatty acid groups of 3–4 carbon atoms being present in predominating amount and 5–40% of dibutyl sebacate.

4. A composition of matter comprising 100 parts of cellulose acetate propionate containing at least 8% of propionyl and not more than 3 free hydroxyls per 24 carbon atoms in the cellulose unit and 5–40 parts of a plasticizer essentially consisting of dibutyl sebacate.

5. A composition of matter comprising 100 parts of cellulose acetate butyrate containing at least 8% of butyryl and not more than 3 free hydroxyls per 24 carbon atoms in the cellulose unit and 5–40 parts of a plasticizer essentially consisting of dibutyl sebacate.

6. A composition of matter comprising 100 parts of a lower fatty acid ester of cellulose at least 8% of which is fatty acid groups of 3–4 carbon atoms which ester contains no more than 3 free hydroxyls per 24 carbon atoms in the cellulose unit and 5–40 parts of a plasticizer essentially consisting of equal parts of dibutyl sebacate and triphenyl phosphate.

7. A composition of matter comprising 100 parts of a butyric acid ester of cellulose containing at least 25% butyryl and 5–40 parts of a plasticizer essentially consisting of equal parts of dibutyl sebacate and triphenyl phosphate.

HENRY B. SMITH.